United States Patent
Li et al.

(10) Patent No.: US 10,977,021 B2
(45) Date of Patent: Apr. 13, 2021

(54) SE APPLET PROCESSING METHOD, TERMINAL, AND SERVER

(71) Applicant: Huawei Technologies Co., Ltd., Shenzhen (CN)

(72) Inventors: Hui Li, Helsinki (FI); Meilun Xie, Beijing (CN); Zhuofei Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/702,690

(22) Filed: Dec. 4, 2019

(65) Prior Publication Data

US 2020/0104109 A1 Apr. 2, 2020

Related U.S. Application Data (63) Continuation of application No. PCT/CN2018/087403, filed on May 18, 2018.

(30) Foreign Application Priority Data

Jun. 5, 2017 (CN) .......................... 201710413204.1

(51) Int. Cl.
*G06F 9/445* (2018.01)
*G06F 8/61* (2018.01)
*H04L 29/08* (2006.01)

(52) U.S. Cl.
CPC ................. *G06F 8/61* (2013.01); *H04L 67/34* (2013.01)

(58) Field of Classification Search
CPC .......................................................... G06F 8/61
USPC ......................................................... 717/175
See application file for complete search history.

(56) References Cited

U.S. PATENT DOCUMENTS

| | | | | |
|---|---|---|---|---|
| 6,978,378 B1 * | 12/2005 | Koretz | ................. | G06F 3/0481 713/193 |
| 8,381,307 B2 * | 2/2013 | Cimino | ............. | G06Q 20/3552 726/27 |
| 8,484,632 B2 * | 7/2013 | Jogand-Coulomb | ... | G06F 9/445 717/168 |

(Continued)

FOREIGN PATENT DOCUMENTS

| CN | 106102054 A | 11/2016 |
|---|---|---|
| CN | 106254323 A | 12/2016 |
| CN | 106547618 A | 3/2017 |

OTHER PUBLICATIONS

Machine Translation and Abstract of Chinese Publication No. CN106102054, Nov. 9, 2016, 12 pages.

(Continued)

*Primary Examiner* — Evral E Bodden
(74) *Attorney, Agent, or Firm* — Conley Rose, P.C.

(57) ABSTRACT

A secure element (SE) applet installation method, applied to a user terminal with a trusted execution environment (TEE) and an SE, and the TEE is provided with a trusted application (TA). The SE applet installation method includes obtaining, by the TA, an SE applet command package after the user terminal receives an installation request instructing the TA to obtain the SE applet command package, parsing, by the TA, the SE applet command package to obtain target signaling included in the SE applet command package, where the target signaling being used to install a target SE applet, and sending, by the TA, the target signaling to the SE to install the target SE applet according to the target signaling.

20 Claims, 6 Drawing Sheets

(56) References Cited

U.S. PATENT DOCUMENTS

| | | |
|---|---|---|
| 2004/0154013 A1 | 8/2004 | Jong |
| 2008/0005261 A1 | 1/2008 | Adams et al. |
| 2015/0331698 A1 | 11/2015 | Dietze et al. |
| 2016/0254904 A1* | 9/2016 | Hjelm ................ H04L 9/006 |
| | | 713/155 |
| 2016/0275290 A1 | 9/2016 | Kotary et al. |
| 2017/0103382 A1 | 4/2017 | Kim et al. |
| 2018/0152454 A1* | 5/2018 | Kwon ................ H04L 63/10 |

OTHER PUBLICATIONS

Machine Translation and Abstract of Chinese Publication No. CN106254323, Dec. 21, 2016, 13 pages.
Machine Translation and Abstract of Chinese Publication No. CN106547618, Mar. 29, 2017, 29 pages.
Foreign Communication From a Counterpart Application, PCT Application No. PCT/CN2018/087403, English Translation of International Search Report dated Aug. 6, 2018, 2 pages.
Foreign Communication From a Counterpart Application, PCT Application No. PCT/CN2018/087403, English Translation of Written Opinion dated Aug. 6, 2018, 3 pages.
Global Platform "Open Platform Card Specification," Version 2.0.1, XP055305434, Apr. 7, 2000, 183 pages.

* cited by examiner

FIG. 9

SE APPLET PROCESSING METHOD, TERMINAL, AND SERVER

CROSS-REFERENCE TO RELATED APPLICATIONS

This application is a continuation of International Patent Application No. PCT/CN2018/087403 filed on May 18, 2018, which claims priority to Chinese Patent Application No. 201710413204.1 filed on Jun. 5, 2017. The disclosures of the aforementioned applications are hereby incorporated by reference in their entireties.

TECHNICAL FIELD

This application relates to the communications field, and in particular, to a secure element (SE) applet processing method, a user terminal, and a server.

BACKGROUND

A secure element (SE) is a general term for hardware SEs in which a microchip is built, is a small computing and storage communications entity that can independently operate, and usually has very high security. The SE is applied to a very wide range of fields. For example, the SE is widely applied to a plurality of fields in forms of a financial integrated circuit (IC) card, a subscriber identification module (SIM) card of a mobile phone, a bank Universal Serial Bus (USB) key, a one-card pass, and an electronic passport. An application program (APP) running on the SE is referred to as an SE applet. Usually, one or more SE applets may run on the SE. For example, a bank payment applet runs in the financial IC card, and a bus payment applet runs in the one-card pass. As functions of an intelligent user terminal (for example, a mobile phone) are increasingly powerful, the SE is increasingly widely applied to the user terminal. For example, SE applets such as a bus payment applet and a bank payment applet are installed on an SE of a mobile phone such that functions corresponding to the SE applets such as the bus payment applet and the bank payment applet can be implemented using the mobile phone.

In other approaches, an SE applet is downloaded and installed on an SE in a user terminal mainly using a trusted service manager (TSM) server. A general procedure is as follows. The user terminal sends a download request to an application TSM server of an application provider (for example, a bank). After receiving the download request of the user terminal, the application TSM server requests an original equipment manufacturer (OEM) TSM server to establish a security domain on the SE of the user terminal. The application TSM server establishes a secure channel between the application TSM server and the security domain on the SE through forwarding by a client application (CA) in a rich execution environment (REE) and a trusted application (TA) in a trusted execution environment (TEE) of the user terminal. After the application TSM server sends the SE applet to the OEM TSM server, the OEM TSM server distributes signaling to the security domain on the SE of the user terminal through the secure channel, for example, SE auxiliary commands such as a download command and an installation command, and an SE load command that is obtained through conversion from the SE applet and that includes installation data of the SE applet. After receiving the foregoing signaling, the SE parses each signaling sent by the OEM TSM server, to download the SE applet and install the SE appletE.

However, some other approaches in which the user terminal downloads the SE applet and installs the SE applet on the SE includes interaction between the application TSM server of the application provider, the OEM TSM server, and the user terminal. During the interaction, an external TSM server distributes an SE command to the SE of the user terminal using the CA and the TA of the user terminal, and therefore an interaction chain is complex. Consequently, it takes a relatively long time to install the SE applet on the SE of the user terminal.

SUMMARY

Embodiments of this application provide an SE applet processing method, to resolve a problem that it takes too much time to install an SE applet on an SE of a user terminal.

To resolve the foregoing problem, the embodiments of this application provide the following technical solutions.

According to a first aspect, an embodiment of this application provides an SE applet processing method. The SE applet processing method is applied to a user terminal provided with a TEE and an SE, and a TA further runs in the TEE. In this method, the TA obtains an SE applet command package after the user terminal receives an installation request used to instruct the TA to obtain the SE applet command package, the TA parses the SE applet command package to obtain target signaling that is included in the SE applet command package and that is used to install a target SE applet, and the TA sends the target signaling to the SE after obtaining the target signaling such that the SE installs the target SE applet according to the target signaling.

It can be learned that, in this embodiment of this application, the TA may obtain, by parsing the SE applet command package, the target signaling required to install the SE applet to complete installation of the SE applet. Compared with the other approaches, in the SE applet installation method proposed in this embodiment of this application, an external TSM server does not need to send, to the user terminal through forwarding by the CA, signaling required for downloading and installation, and therefore an interaction chain is short such that a time for installing the SE applet on the user terminal can be effectively shortened.

In some possible implementations, the target signaling includes an SE auxiliary command and at least two SE load commands that are required to install the target SE applet, the at least two SE load commands are generated using at least two subfiles, the at least two subfiles are obtained by splitting an executable file of the target SE applet, and each SE load command includes at least one subfile. It can be learned that the SE applet command package in this embodiment of this application includes an SE command required by the user terminal to install the target SE applet, and the SE command is not sent using an external server, that is, the external server does not need to keep sending the SE command in real time in a process of installing the SE applet, thereby shortening an interaction chain of installing the SE applet on the SE of the user terminal in this embodiment of this application, and reducing costs. In addition, because the SE applet command package includes installation data of the target SE applet and the SE command that is required by the user terminal to install the target SE applet, the user terminal can complete installation of the target SE applet without a need of networking, thereby reducing interference caused by network instability.

In a possible implementation, the executable file of the target SE applet is a converted applet (CAP) file of the target SE applet. It should be understood that the CAP file of the target SE applet is obtained by compiling a source code of the target SE applet into a class file and then converting the class file. Specific processes are not described herein. It can be learned that, in this implementation, a specific file type of the executable file of the target SE applet is proposed, thereby improving feasibility of the solution, and diversifying the solution.

In a possible implementation, the user terminal downloads a target application program installation package, and the target application program installation package includes the SE applet command package. In this embodiment of this application, obtaining, by the TA, an SE applet command package corresponding to the target SE applet further includes extracting, by the TA, the SE applet command package from the target application program installation package. In this implementation, a specific implementation of obtaining the SE applet command package after the user terminal receives the installation request used to install the target SE applet is proposed, thereby improving feasibility of the solution. In addition, the SE applet command package is bound with the target application program installation package, thereby effectively improving promotion efficiency of the target SE applet.

In a possible implementation, after the user terminal installs a target application program using the target application program installation package, when a user uses the target application program, the user terminal provides, using the target application program, an interaction interface for interacting with the user, and the user terminal may receive the installation request that is used to install the target SE applet and that is generated through a preset operation performed by the user in the interaction interface. In this implementation, a specific implementation of receiving the installation request is proposed, thereby improving feasibility of the solution.

In a possible implementation, obtaining, by the TA, an SE applet command package corresponding to the target SE applet may further include sending, by the user terminal, an obtaining request to an application server configured to provide the target SE applet, and feeding back, by the application server, the SE applet command package to the user terminal after receiving the obtaining request sent by the user terminal such that the TA can obtain the SE applet command package. That is, in this implementation, another specific implementation of obtaining the SE applet command package after the user terminal receives the installation request used to install the target SE applet is proposed, thereby diversifying the solution.

In a possible implementation, sending, by the TA, the target signaling to the SE includes establishing, by the TA, a secure channel between the TA and the SE, and sending, by the TA, the target signaling to the SE through the secure channel. In this implementation, before sending, to the SE of the user terminal, the target signaling obtained through parsing, the TA needs to first establish the secure channel between the TA and the SE, and sends the target signaling to the SE of the user terminal through the secure channel such that security of an entire installation process can be effectively improved.

According to a second aspect, an embodiment of this application provides an SE applet installation method. The SE applet installation method is applied to a user terminal provided with a TEE and an SE, and a TA runs in the TEE. In this method, the SE can receive target signaling that is sent by the TA and that is used to install a target SE applet, where the target signaling is signaling obtained by the TA by parsing an SE applet command package, and the SE installs the target SE applet using the target signaling sent by the SE.

In a possible implementation, the target signaling includes an SE auxiliary command and at least two SE load commands that are required to install the target SE applet, the at least two SE load commands are generated using at least two subfiles, the at least two subfiles are obtained by splitting an executable file of the target SE applet, and each SE load command includes at least one subfile. For example, the executable file of the target SE applet may be a CAP file into which a source code of the target SE applet is converted. In a possible implementation, the executable file of the target SE applet is a CAP file.

In a possible implementation, the SE may receive, through a secure channel established between the TA and the SE, the target signaling sent by the TA.

According to a third aspect, an embodiment of this application further provides an SE applet processing method. In the SE applet processing method, a server obtains an executable file of a target SE applet, the server splits the executable file of the target SE applet into at least two subfiles, the server generates at least two SE load commands based on the at least two subfiles, where each SE load command includes at least one subfile, and the server generates an SE applet command package including target signaling, where the target signaling includes the at least two SE load commands and an SE auxiliary command. In a possible implementation, for example, the executable file of the SE applet may be a CAP file into which a source code of the SE applet is converted. It can be learned that, in the third aspect of this embodiment of this application, a manner of obtaining the SE applet command package corresponding to the target SE applet is provided.

In a possible implementation, after the server obtains the SE applet command package according to the SE load command, the server adds the generated SE applet command package to a target application program installation package to be downloaded by a user terminal. The target application program installation package may be an installation package corresponding to an application program provided by an application program platform for the user terminal to perform downloading. It can be learned that, in this implementation, an implementation of promoting the target SE applet is further proposed. The generated SE applet command package corresponding to the target SE applet is bound with the application program installation package such that the user terminal downloads the SE applet command package corresponding to the target SE applet while downloading the target application program installation package, thereby facilitating promotion of the target SE applet.

In a possible implementation, before the server adds the SE applet command package to the target application program installation package to be downloaded by the user terminal, the server encrypts the SE applet command package using an encryption technology, and then adds the encrypted SE applet command package to the application program installation package to be downloaded by the user terminal. That is, in this implementation, before the SE applet command package corresponding to the target SE applet is added to the application program installation package to be download by the user terminal, the SE applet command package needs to be encrypted, thereby improving security of the SE applet command package. In some possible implementations, a plurality of encryption manners may be used. No specific limitation is imposed. For example, the SE applet command package may be encrypted using a signature encryption technology.

According to a fourth aspect, an embodiment of this application correspondingly provides a TA, and the TA is applied to a user terminal. The user terminal is provided with a TEE and an SE, and the TEE is provided with the TA. The TA includes an obtaining module configured to obtain an SE applet command package after the user terminal receives an installation request used to instruct the TA to obtain the SE applet command package, a parsing module configured to parse the SE applet command package obtained by the obtaining module, to obtain target signaling included in the SE applet command package, where the target signaling is signaling used to install a target SE applet, and a sending module configured to send, to the SE, the target signaling obtained by the parsing module through parsing such that the SE installs the target SE applet according to the target signaling.

In the fourth aspect of this application, component modules of the TA may further perform steps described in the first aspect and all the possible implementations of the first aspect. For details, refer to the descriptions in the first aspect and all the possible implementations of the first aspect. Details are not described herein again.

According to a fifth aspect, an embodiment of this application provides an SE, applied to a user terminal. The user terminal is provided with a TEE and the SE, and the TEE is provided with a TA. The SE includes a receiving module configured to receive target signaling that is sent by the TA and that is used to install a target SE applet, and further includes an installation module configured to install the target SE applet according to the target signaling received by the receiving module.

In the fifth aspect of this application, component modules of the SE may further perform steps described in the second aspect and all the possible implementations of the second aspect. For details, refer to the descriptions in the second aspect and all the possible implementations of the second aspect. Details are not described herein again.

According to a sixth aspect, an embodiment of this application further provides a user terminal. The user terminal is provided with a TEE, and the TEE is provided with a TA that can perform steps described in the first aspect and all the possible implementations of the first aspect.

According to a seventh aspect, an embodiment of this application further provides a user terminal. The user terminal is provided with an SE that can perform steps described in the second aspect and all the possible implementations of the second aspect.

According to an eighth aspect, an embodiment of this application further provides another user terminal. The user terminal has functions of implementing behavior of the user terminal in the foregoing method, and the functions may be implemented by hardware, or may be implemented by hardware by executing corresponding software. The hardware or the software includes one or more modules corresponding to the functions. In a possible implementation, the user terminal includes a memory, a processor, and a computer program that is stored on the memory and that can run on the processor. When executing the computer program, the processor implements the method in the first aspect/all the implementations of the first aspect, or the method in the second aspect/all the implementations of the second aspect.

According to a ninth aspect, an embodiment of this application further provides a server, including an obtaining module configured to obtain an executable file of a target SE applet, and a processing module configured to split, into at least two subfiles, the executable file that is of the target SE applet and that is obtained by the obtaining module, generate at least two SE load commands based on the at least two subfiles, where each SE load command includes at least one subfile, and generate an SE applet command package, where the SE applet command package includes target signaling, and the target signaling includes an SE auxiliary command and the at least two SE load commands.

In the ninth aspect of this application, component modules of the server may further perform steps described in the third aspect and all the possible implementations of the third aspect. For details, refer to the descriptions in the third aspect and all the possible implementations of the third aspect. Details are not described herein again.

According to a tenth aspect, an embodiment of this application further provides another server. The server has functions of implementing behavior of the server in the foregoing method, and the functions may be implemented by hardware, or may be implemented by hardware by executing corresponding software. The hardware or the software includes one or more modules corresponding to the functions. In a possible design, the server includes a memory, a processor, and a computer program that is stored on the memory and that can run on the processor. When executing the computer program, the processor implements the method in the third aspect/all the implementations of the third aspect.

According to an eleventh aspect, this application provides a computer readable storage medium. The computer readable storage medium stores an instruction, and when the instruction runs on a computer, the computer is enabled to perform the method in the first aspect/all the implementations of the first aspect, or the method in the second aspect/all the implementations of the second aspect.

According to a twelfth aspect, this application provides a computer readable storage medium. The computer readable storage medium stores an instruction, and when the instruction runs on a computer, the computer is enabled to perform the method in the third aspect/all the implementations of the third aspect.

It can be learned from the foregoing technical solutions that, compared with the other approaches, in the SE applet installation method proposed in the embodiments of this application, the external TSM server does not need to send, to the user terminal through forwarding by the CA, the signaling required for installation, and therefore the interaction chain is short such that the time for installing the SE applet on the user terminal can be effectively shortened.

DESCRIPTION OF EMBODIMENTS

The embodiments of this application provide an SE applet processing method, a user terminal, and a server, to effectively resolve a problem that it takes too much time to install an SE applet on an SE of the user terminal.

To make persons skilled in the art better understand the solutions in this application, the following describes the technical solutions in the embodiments of this application with reference to the accompanying drawings in the embodiments of this application. The described embodiments are merely some but not all of the embodiments of this application. All other embodiments obtained by persons of ordinary skill in the art based on the embodiments of this application shall fall within the protection scope of this application.

It should be noted that, in the specification, claims, and accompanying drawings of this application, the terms "first", "second", "third", "fourth", and the like (if existent) are intended to distinguish between similar objects but do not necessarily indicate a specific order or sequence. It should be understood that the terms used in such a way are interchangeable in proper circumstances such that the embodiments described herein can be implemented in other orders than the order illustrated or described herein. In addition, the terms "include" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

The following describes the embodiments of this application.

Figure 1:
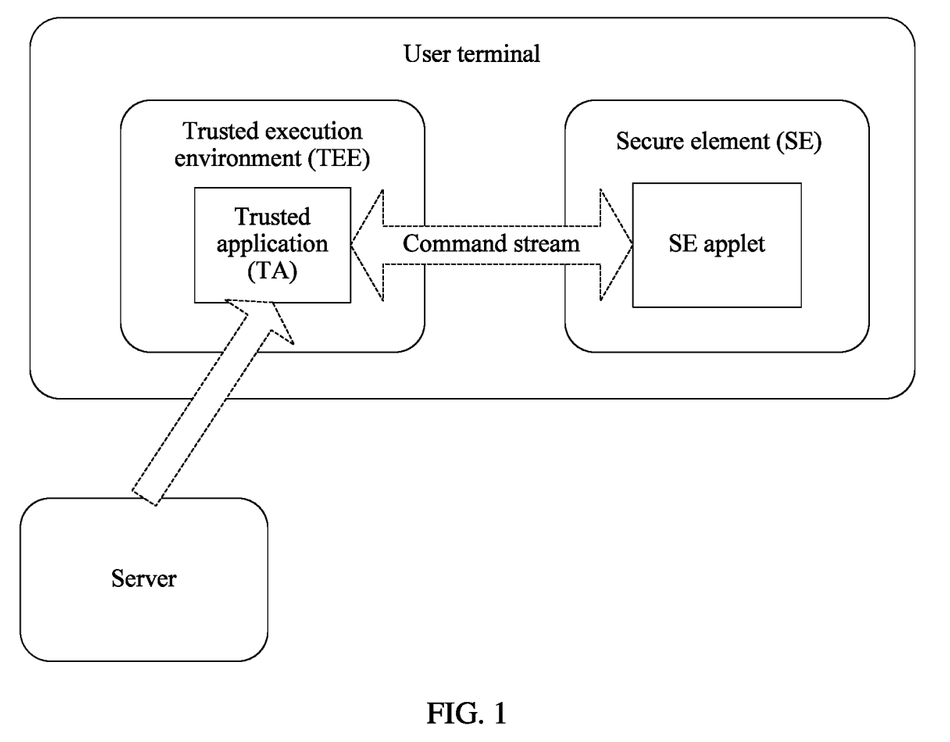
FIG. 1 is a schematic diagram of a system framework of an SE applet processing method according to an embodiment of this application.

First, a system framework to which an SE applet processing method provided in an embodiment of this application is applied is described. FIG. 1 is a schematic diagram of a system framework of an SE applet processing method according to an embodiment of this application. The system framework includes a server and a user terminal. The user terminal may include but is not limited to a terminal device such as a mobile phone or a tablet computer. No specific limitation is imposed herein. The SE applet processing method provided in this embodiment of this application mainly includes content in two aspects. First, the server aims to generate, based on an executable file of a target SE applet after obtaining the executable file of the target SE applet, a corresponding SE applet command package including signaling required to install the target SE applet. Second, a user terminal side aims to improve a TA. The TA may obtain an SE applet command package, and the TA can parse the SE applet command package to obtain signaling required to install a target SE applet such that an SE installs the target SE applet using the signaling obtained by the TA by parsing the SE applet command package. The following describes the embodiments of this application in detail for the two aspects.

First, a process in which the server generates the SE applet command package is as follows.

Figure 2:
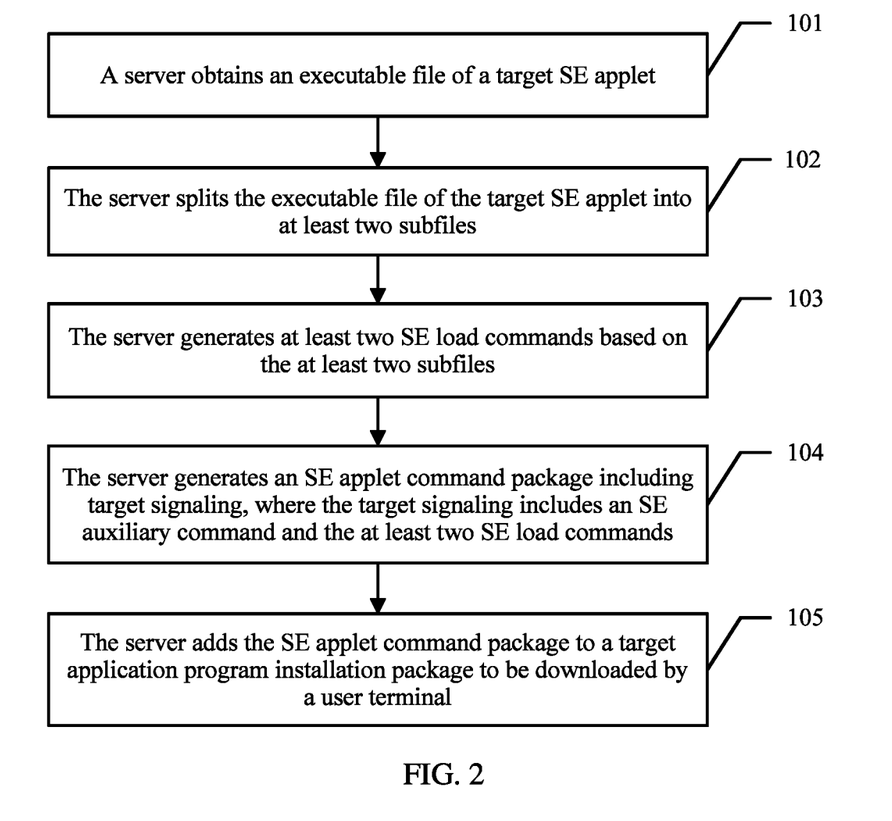
FIG. 2 is a schematic flowchart of an embodiment of an SE applet processing method according to an embodiment of this application.

FIG. 2 is a schematic flowchart of an embodiment of an SE applet processing method according to an embodiment of this application. The method includes the following steps.

Step 101. A server obtains an executable file of a target SE applet.

The executable file of the target SE applet is an executable file into which a source code of the target SE applet is converted and that includes installation data of the target SE applet. For example, in this embodiment of this application, the executable file may be a CAP file corresponding to the target SE applet. The CAP file is a file into which a JAVA source code that conforms to the GLOBALPLATFORM (GP) standard and the JAVA CARD SE standard is converted.

Further, in some embodiments of this application, that a server obtains an executable file of a target SE applet includes that the server obtains the source code of the target SE applet, converts the source code into a class file, and then converts the class file into the CAP file.

It should be noted that the executable file of the target SE applet may be another executable file in addition to the CAP file. No specific limitation is imposed herein. For ease of description, all executable files described below are a CAP file of an SE applet.

Step 102. The server splits the executable file of the target SE applet into at least two subfiles.

In this embodiment of this application, after obtaining the executable file of the target SE applet, the server splits the executable file into the at least two subfiles. Each subfile includes a part of the installation data of the executable file of the target SE applet. A specific quantity of subfiles into which the executable file is split may be configured based on an actual application condition, for example, may be determined based on a size of the executable file of the target SE applet. No limitation is imposed herein.

Step 103. The server generates at least two SE load commands based on the at least two subfiles.

After splitting the executable file of the target SE applet into the at least two subfiles, the server generates the at least two SE load commands based on the at least two subfiles obtained through splitting. Each SE load command includes at least one subfile. There may be a plurality of cases in which the at least two SE load commands are generated based on the at least two subfiles. Further, configuration may be performed based on an actual application condition. No limitation is imposed herein.

It should be noted herein that, in this embodiment of this application, each SE load command may include instruction information in addition to the subfile. After receiving the at least two SE load commands and then parsing the at least two SE load commands to correspondingly obtain the at least two subfiles, a user terminal may restore the at least two subfiles to the CAP file using instruction information included in the at least two subfiles.

For example, assuming that the CAP file of the target SE applet is split into five subfiles, the server may generate five SE load commands, and each of the five SE load commands includes one subfile. Each SE load command may include instruction information in addition to the subfile. The instruction information is used to instruct the user terminal to restore the five subfiles to the CAP file after the user terminal receives the five SE load commands and then parses the five SE load commands to correspondingly obtain the five subfiles.

Step 104. The server generates an SE applet command package including target signaling, where the target signaling includes an SE auxiliary command and the at least two SE load commands.

After obtaining the at least two SE load commands based on the executable file of the target SE applet, the server may generate the SE applet command package including the target signaling. The target signaling is signaling used to install the target SE applet, and the target signaling includes the at least two SE load commands and the SE auxiliary command.

The SE auxiliary commands are some SE commands required when the user terminal installs the target SE applet. In some embodiments of this application, the SE auxiliary commands may include but are not limited to the following SE commands:

i. Reset; ii. Select; iii. Install for download; iv. Download; v. Install for install; vi. Install for personalization; vii. Place a key; viii. Place data; ix. Obtain data; x. Set a state; xi. Obtain a state; and xii. Delete.

It should be noted that, in some embodiments of this application, in addition to the foregoing SE commands for implementing some fixed actions (for example, a deletion action), the SE auxiliary commands may include an SE command included in an SE command set for implementing a specific fixed function. The foregoing SE command set may include but is not limited to the following functions:

i. An SE command corresponding to a function used to determine whether an SE that installs the target SE applet meets a condition required to install the target SE applet. For example, it is checked whether there is a supplementary security domain (SSD) to be established in the SE. If there is an SSD to be established in the SE, a package attached to the SSD is first deleted, and the SSD is then deleted. It is checked whether the foregoing package exists. If the package exists, an instance JAVA corresponding to the package is first deleted, and the package is then deleted.

ii. An SE command required for a function used to open a secure channel, including but not limited to the secure channel protocol (SCP) 02, the SCP 03, and the SCP 11.

Figure 3:
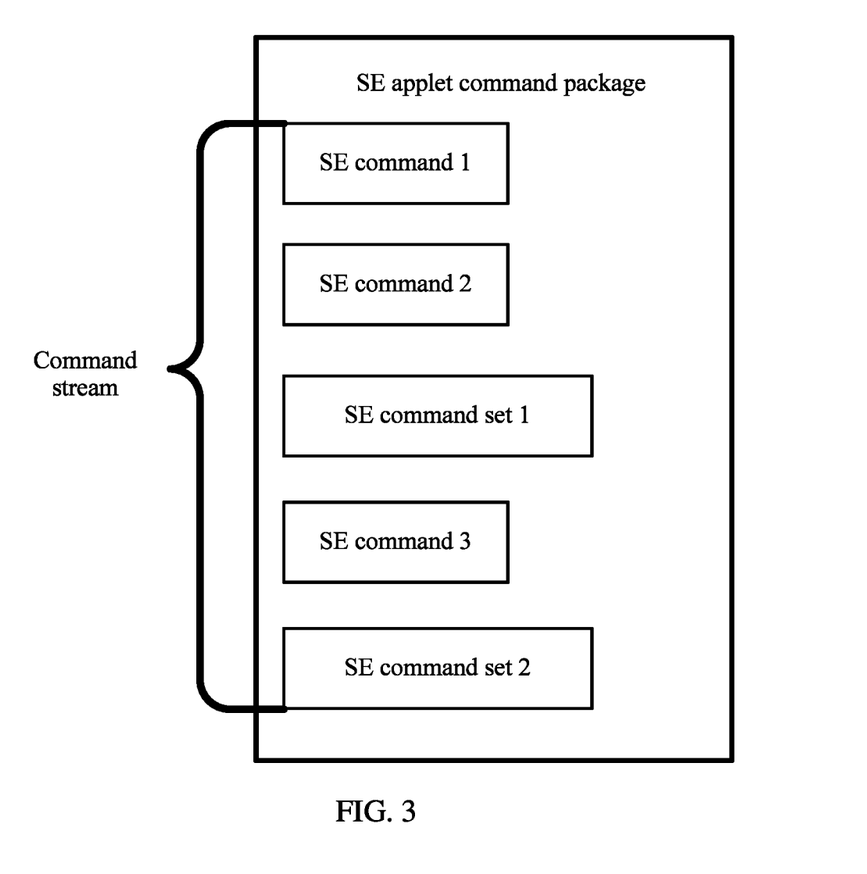
FIG. 3 is a schematic structural diagram of an embodiment of an SE applet command package according to an embodiment of this application.

FIG. 3 is a schematic structural diagram of an embodiment of an SE applet command package according to an embodiment of this application. The SE applet command package includes a command stream including an SE load command and SE auxiliary commands such as an SE command 1, an SE command 2, an SE command 3, an SE command set 1, and an SE command set 2.

In this way, the server obtains the SE applet command package corresponding to the SE applet. In some embodiments of this application, after the server obtains the SE applet command package, the method further includes the following step.

Step 105. The server adds the SE applet command package to a target application program installation package to be downloaded by a user terminal.

To be specific, after obtaining the SE applet command package corresponding to the target SE applet, the server places the SE applet command package in the target application program installation package to be downloaded by the user terminal. For example, in an ANDROID system, the obtained SE applet command package may be placed in an ANDROID package (APK). It should be noted that, in this embodiment of this application, the server may place the obtained SE applet command package in any application program installation package to be downloaded by the user terminal. For example, the server may place the SE applet command package in an installation package corresponding to any application provided by Huawei APP Store. No limitation is imposed herein.

In some embodiments of this application, before the server adds the SE applet command package to the target application program installation package to be downloaded by the user terminal, the method further includes the following step.

The server encrypts the SE applet command package using an encryption technology, and adds the encrypted SE applet command package to the target application program installation package to be downloaded by the user terminal. For example, the SE applet command package may be encrypted using a signature encryption technology. In this way, security of the SE applet command package can be effectively improved.

An actual application scenario is used as an example. Assuming that a bank A currently launches a new SE payment applet A, the server may obtain an executable file of the SE payment applet A, convert the executable file of the SE payment applet A into a corresponding applet A command package in the manner described in the foregoing steps, place the applet A command in an installation package of a related application program of the bank A, and provide downloading of the related APP on some APP download platforms. It can be learned that the SE payment applet A may be released together with the related APP of the bank A in the foregoing manner such that the user terminal correspondingly downloads the foregoing SE applet when downloading the related APP on the APP download platform, thereby effectively improving promotion efficiency of the SE applet.

Second, a process in which the user terminal installs the target SE applet based on the SE applet command package is as follows.

Figure 4:
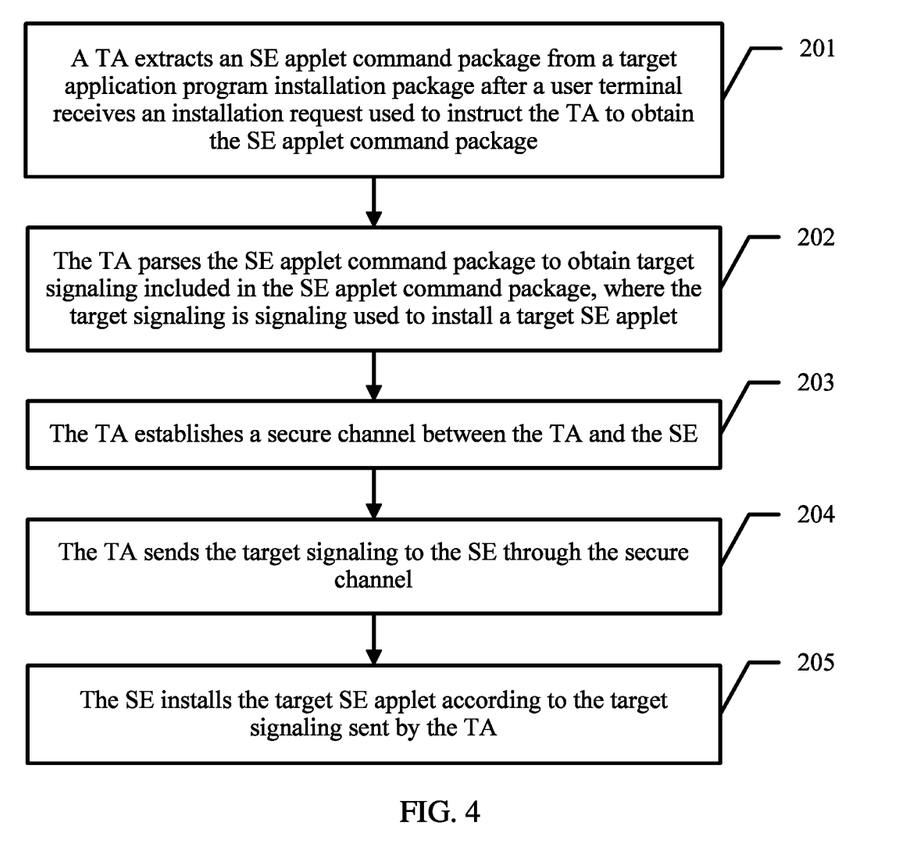
FIG. 4 is a schematic flowchart of another embodiment of an SE applet processing method according to an embodiment of this application.

FIG. 4 is a schematic flowchart of another embodiment of an SE applet processing method according to an embodiment of this application. The method is applied to a user terminal. The user terminal is provided with a TEE and an SE, and the TEE is provided with a TA. The user terminal downloads the target application program installation package including the SE applet command package described in the foregoing embodiment. The method includes the following steps.

Step 201. The TA extracts an SE applet command package from the target application program installation package after the user terminal receives an installation request used to instruct the TA to obtain the SE applet command package.

In some embodiments of this application, after the user terminal installs the target application program using the target application program installation package, when a user uses the target application program, the user terminal provides, using the target application program, an interaction interface for interacting with the user, and the user terminal may receive the installation request that is used to install the target SE applet and that is generated through a preset operation performed by the user in the interaction interface.

It should be noted that, in some embodiments of this application, in addition to the foregoing manner in which the TA extracts and obtains the SE applet command package from the target application program installation package, the TA may obtain the SE applet command package in another manner after the user terminal receives the installation request used to instruct the TA to obtain the SE applet command package. No limitation is imposed herein.

For example, after the user terminal receives the installation request used to instruct the TA to obtain the SE applet command package, the TA may send an obtaining request to an application server of the target SE applet. After receiving the obtaining request, the application server feeds back the SE applet command package to the user terminal such that the TA can obtain the SE applet command package.

Step 202. The TA parses the SE applet command package to obtain target signaling included in the SE applet command package, where the target signaling is signaling used to install a target SE applet.

It should be noted that, in this embodiment of this application, if the SE applet command package obtained by the TA is an SE applet command package encrypted using an encryption technology, the TA may further decrypt the encrypted SE applet command package to obtain the target signaling included in the SE applet command package.

In addition, the target signaling includes an SE auxiliary command and at least two SE load commands. Herein, for detailed content of the target signaling, refer to related descriptions of generating the SE applet command package by the server in the foregoing descriptions. Details are not described herein again.

Step 203. The TA establishes a secure channel between the TA and the SE.

The TA establishes the secure channel used to distribute the target signaling to the SE.

It should be noted that there is no execution sequence of step 203 and step 202. No limitation is imposed herein.

Step 204. The TA sends the target signaling to the SE through the secure channel.

In this embodiment of this application, the TA may distribute the target signaling to the SE through the secure channel established between the TA and the SE.

Step 205. The SE installs the target SE applet according to the target signaling sent by the TA.

After receiving the target signaling sent by the TA, the SE completes an installation process of the target SE applet according to the target signaling sent by the TA.

For ease of understanding, the following describes the foregoing embodiment of this application using an actual application scenario. A bank A is used as an example. Assuming that the bank A currently needs to launch a new SE payment applet A, a programmer writes a source code that is of the SE payment applet A and that meets a requirement, the source code of the SE payment applet A is converted into a CAP file, and a corresponding SE applet command package is generated. Herein, assuming that the CAP file of the SE payment applet A is split into five SE load commands (CMD_LOAD), the generated SE applet command package is shown as follows:

```
CMD_SELECT;
CMDS_DELETE_EXISTING_PKG (SE command set 1);
CMDS_OPEN_SC (SE command set 2);
CMD_INSTALL_FOR_LOAD (install for download);
CMD_LOAD_1;
CMD_LOAD_2;
CMD_LOAD_3;
CMD_LOAD_4;
CMD_LOAD_5; and
CMD_INSTALL_FOR_INSTALL (install for install).
```

After signature encryption is performed on the SE applet command package, the encrypted SE applet command package is combined with an official APP installation package of the bank A, and is released together with an official APP of the bank A in Huawei APP store.

The user terminal downloads the official APP installation package of the bank A from Huawei APP Store. The user uses the user terminal to install the official APP of the bank A based on the official APP installation package of the bank A. In a process in which the user terminal installs the official APP of the bank A, the user is prompted whether to choose to install the SE payment applet A. If the user chooses to install the SE payment applet A, the SE applet command package is loaded in the TEE, and the user terminal uses the TA to read a ciphertext of the SE applet command package and decrypt the SE applet command package. After the decryption, the TA parses the SE applet command package, and sends a corresponding SE command to the SE. For details, refer to the following steps:

```
Sending APDU_SELECT to select an SSD;
Parsing a command set CMDS_DELETE_EXISTING_PKG;
First sending APDU_SELECT to select a package AID (Applet ID);
Ending if the SE returns no package; or
Sending APDU_DELETE to delete the package, and the ending if the
SE returns a selection success;
Parsing a command set CMDS_OPEN_SC to open the secure chan-
nel;
Sending APDU_INITIAL_UPDATE;
Sending APDU_EXTERNAL_AUTH;
Sending APDU_INSTALL_FOR_LOAD to prompt the SE to prepare
for downloading;
```

Successively sending APDU_LOADs, where when the SE receives a last SE load command, the SE restores a CAP file of the SE payment applet A through assembly inside the SE; and Sending APDU_INSTALL_FOR_INSTALL, where after receiving the command, the SE starts to install the SE payment applet based on the CAP file of the SE payment applet A.

In conclusion, in this embodiment of this application, the TA may receive, by parsing the SE applet command package, the target signaling required for the target SE applet to complete installation of the SE applet. Compared with the other approaches, in the SE applet installation method proposed in this embodiment of this application, an external TSM server does not need to send, to the user terminal through forwarding by the CA and the TA, signaling required for downloading and installation, and therefore an interaction chain is short such that a time for downloading the SE applet and installing the SE applet on the user terminal can be effectively shortened. It should be noted that, for brief descriptions, the foregoing method embodiments are represented as a combination of a series of actions. However, persons skilled in the art should appreciate that this application is not limited to the described order of the actions, because according to this application, some steps may be performed in other orders or simultaneously. In addition, persons skilled in the art should also appreciate that the embodiments described in this specification all belong to example embodiments, and the related actions and modules are not necessarily required by this application.

To better implement the solutions described in the embodiments of this application, the following further provides a related apparatus configured to implement the foregoing solutions.

Figure 5:
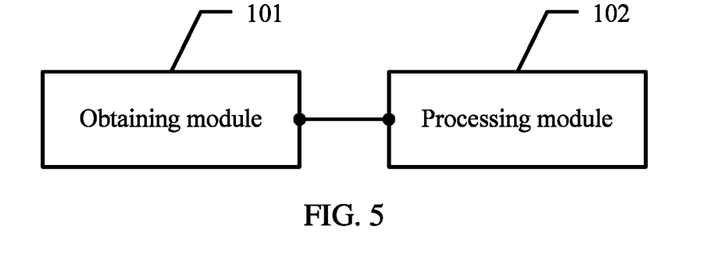
FIG. 5 is a schematic structural diagram of an embodiment of a server according to an embodiment of this application.

FIG. 5 is a schematic structural diagram of an embodiment of a server according to an embodiment of this application. The server includes an obtaining module 101 and a processing module 102.

The obtaining module 101 is configured to obtain an executable file of a target SE applet.

The processing module 102 is configured to split, into at least two subfiles, the executable file that is of the target SE applet and that is obtained by the obtaining module 101, generate at least two SE load commands based on the at least two subfiles, where each SE load command includes at least one subfile, and generate an SE applet command package, where the SE applet command package includes target signaling, and the target signaling includes an SE auxiliary command and the at least two SE load commands.

In some embodiments of this application, the processing module 102 is further configured to after obtaining the SE applet command package according to the SE load command, add the SE applet command package to a target application program installation package to be downloaded by a user terminal.

In some embodiments of this application, the processing module 102 is further configured to encrypt the SE applet command package using an encryption technology before adding the SE applet command package to the target application program installation package to be downloaded by the user terminal.

That the processing module 102 is configured to add the SE applet command package to a target application program installation package to be downloaded by a user terminal includes that the processing module 102 is configured to add the encrypted SE applet command package to the target application program installation package to be downloaded by the user terminal.

Figure 6:
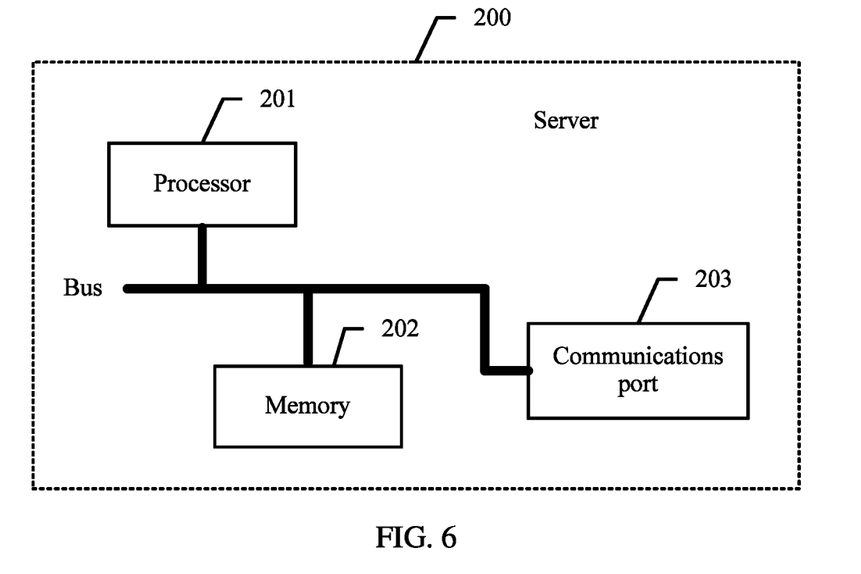
FIG. 6 is a schematic structural diagram of another embodiment of a server according to an embodiment of this application.

FIG. 6 is a schematic structural diagram of a server according to an embodiment of this application. The server 200 mainly includes hardware structures such as a processor 201 (there may be one or more processors 201 in the server 200, and one processor is used as an example in FIG. 6), a memory 202, and a communications port 203, and further includes parts such as a power supply, a computer program that is stored on the memory 202 and that can be executed by the processor 201, and an operating system installed on hardware. The parts are not enumerated in FIG. 6, but do not constitute a limitation on the server 200 in this embodiment of this application. In some embodiments of this application, the processor 201, the memory 202, and the communications port 203 may be connected through a bus or in another manner. No specific limitation is imposed herein. An example in which connection is performed through the bus is used for description in FIG. 6.

The memory 202 may include a read-only memory (ROM) and a random access memory (RAM), or may include another memory or storage medium, and provide the processor 201 with an instruction and data. A part of the memory 202 may further include a nonvolatile RAM (NVRAM). The memory 202 stores an operating system and an operation instruction, an executable module or a data structure, or a subset thereof, or an extended set thereof. The operation instruction may include various operation instructions, to implement various operations. The operating system may include various system programs, to implement various basic services and process hardware-based tasks. The memory 202 further stores data, signaling, and the like in this embodiment of this application.

The processor 201 is configured to control operations of the server 200. The processor 201 may also be referred to as a central processing unit (CPU). In specific application, components of the server 200 are coupled together through a bus system. In addition to a data bus, the bus system may include a power bus, a control bus, a status signal bus, and the like. However, for clarity of description, various buses are referred to as the bus in FIG. 6.

The method on a server side disclosed in the embodiments of this application may be applied to the processor 201, or may be implemented by the processor 201. The processor 201 may be an IC chip and has a signal processing capability. In an implementation process of this embodiment of this application, each step performed on the server side in this embodiment of this application may be implemented by the processor 201 by executing the computer program stored on the memory 202. The processor 201 may be a general-purpose processor, a digital signal processor (DSP), an application-specific IC (ASIC), a field-programmable gate array (FPGA) or another programmable logic device, a discrete gate or transistor logic device, or a discrete hardware component, and may implement or perform all methods, steps, and logical block diagrams disclosed in the embodiments of this application. The general-purpose processor may be a microprocessor, or the processor may be any conventional processor, or the like. Steps of the methods disclosed with reference to the embodiments of this application may be directly performed and completed by a hardware decoding processor, or may be performed and completed using a combination of hardware in the decoding processor and a software module. The software module may be located in a mature storage medium in the art, such as a RAM, a flash memory, a ROM, a programmable ROM (PROM), an electrically erasable PROM (EEPROM), or a register. The storage medium is located in the memory 202, and the processor 201 reads information in the memory 202 and implements the steps of the server in the SE applet processing method in the embodiments of this application in combination with hardware of the processor 201.

The communications port 203 may be configured to receive or send information/data, for example, feedback an SE applet command package to a user terminal, and generate a signal related to a related setting and control of the server to perform processing such as initialization on the server.

Figure 7:
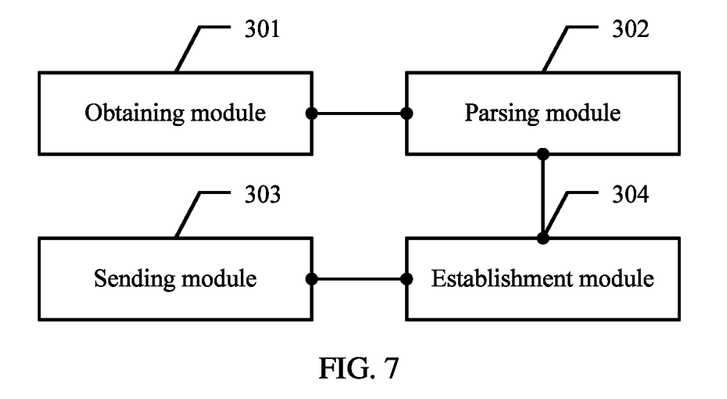
FIG. 7 is a schematic structural diagram of an embodiment of a TA according to an embodiment of this application.

FIG. 7 is a schematic structural diagram of an embodiment of a TA according to an embodiment of this application. The TA is applied to a user terminal. The user terminal is provided with a TEE and an SE, and the TEE is provided with the TA. The TA includes an obtaining module 301, a parsing module 302, and a sending module 303.

The obtaining module 301 is configured to obtain an SE applet command package after the user terminal receives an installation request used to instruct the TA to obtain the SE applet command package.

The parsing module 302 is configured to parse the SE applet command package obtained by the obtaining module 301 to obtain target signaling included in the SE applet command package, where the target signaling is signaling used to install a target SE applet.

The sending module 303 is configured to send, to the SE, the target signaling obtained by the parsing module 302 through parsing such that the SE installs the target SE applet according to the target signaling.

In some embodiments of this application, the target signaling includes an SE auxiliary command and at least two SE load commands, the at least two SE load commands are generated using at least two subfiles, the at least two subfiles are obtained by splitting an executable file of the target SE applet, and each SE load command includes at least one subfile.

In some embodiments of this application, the user terminal downloads a target application program installation package, the target application program installation package includes the SE applet command package, and that the obtaining module 301 is configured to obtain an SE applet command package corresponding to the target SE applet includes that the obtaining module 301 is configured to extract the SE applet command package from the target application program installation package.

In some embodiments of this application, the TA further includes an establishment module 304.

The establishment module 304 is configured to establish a secure channel between the TA and the SE.

That the sending module 303 is configured to send, to the SE, the target signaling obtained by the parsing module 302 through parsing includes that the sending module 303 is configured to send, to the SE through the secure channel established by the establishment module 304, the target signaling obtained by the parsing module 302 through parsing.

It should be noted that content such as information exchange between the modules/units in the TA or an execution process is based on a same idea as functions of the TA in the method embodiment in the embodiments of this application. For more details, refer to a part performed by the TA in the method embodiment. For specific content, refer to descriptions of the TA in the method embodiment described above in this application. Details are not described herein again.

An embodiment of this application further provides a computer device, including a memory, a processor, and a computer program that is stored on the memory and that can run on the processor. When executing the computer program, the processor implements some or all of the steps described on a side of the TA.

Figure 8:
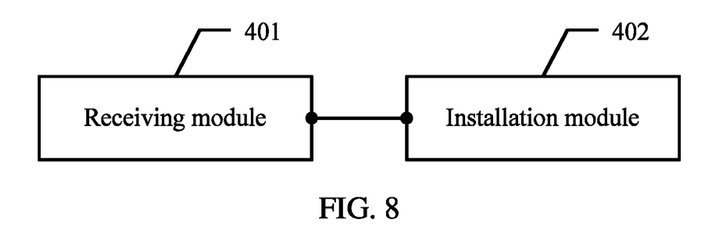
FIG. 8 is a schematic structural diagram of an embodiment of an SE according to an embodiment of this application.

FIG. 8 is a schematic structural diagram of an embodiment of an SE according to an embodiment of this application. The SE is applied to a user terminal. The user terminal is provided with a TEE and the SE, and the TEE is provided with a TA. The SE includes a receiving module 401 and an installation module 402.

The receiving module 401 is configured to receive target signaling sent by the TA, where the target signaling is signaling used to install the target SE applet, and the target signaling is signaling obtained by the TA by parsing an SE applet command package.

The installation module 402 is configured to install the target SE applet according to the target signaling received by the receiving module 401.

In some embodiments of this application, the target signaling includes an SE auxiliary command and at least two SE load commands, the at least two SE load commands are generated using at least two subfiles, the at least two subfiles are obtained by splitting an executable file of the target SE applet, and each SE load command includes at least one subfile.

In some embodiments of this application, that the receiving module 401 is configured to receive target signaling sent by the TA includes that the receiving module 401 is configured to receive, through a secure channel, the target signaling sent by the TA, where the secure channel is a secure channel between the TA and the SE.

It should be noted that content such as information exchange between the modules/units in the SE or an execution process is based on a same idea as functions of the SE in the method embodiment in the embodiments of this application. For more details, refer to a part performed by the SE in the method embodiment. For specific content, refer to descriptions of the SE in the method embodiment described above in this application. Details are not described herein again.

An embodiment of this application further provides a computer device, including a memory, a processor, and a computer program that is stored on the memory and that can run on the processor. When executing the computer program, the processor implements some or all of the steps described on a side of the SE.

An embodiment of this application further provides a user terminal. The user terminal is provided with a TEE. The TEE is provided with the TA described in the foregoing embodiments, and/or the user terminal is provided with the SE described in the foregoing embodiments.

Figure 9:
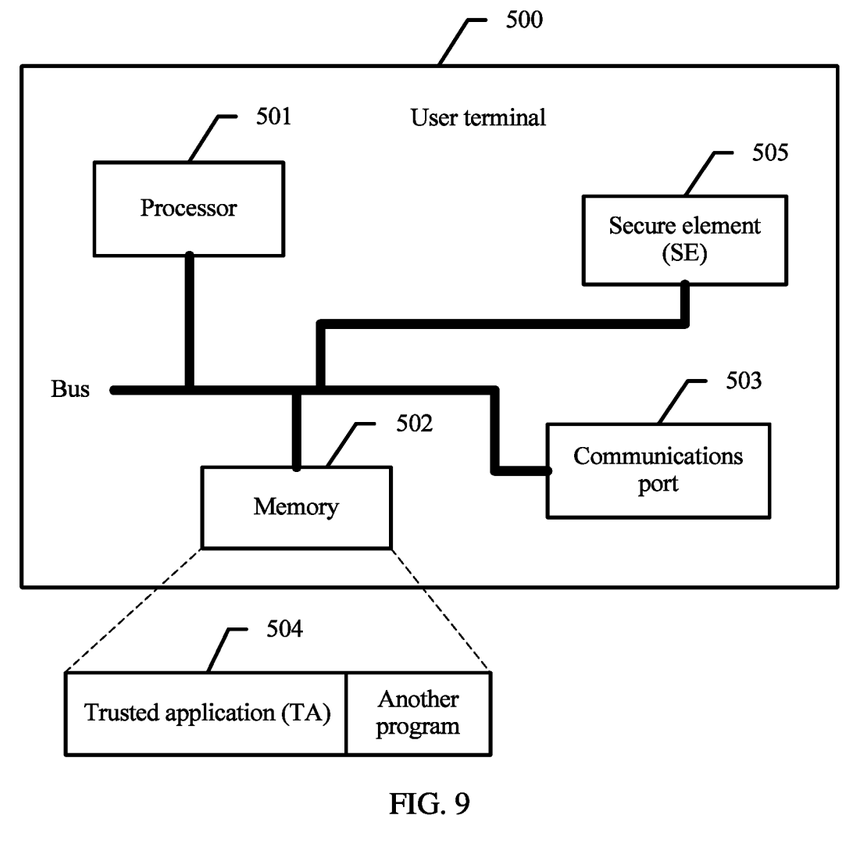
FIG. 9 is a schematic structural diagram of an embodiment of a user terminal according to an embodiment of this application.

Referring to FIG. 9, an embodiment of this application further provides another user terminal. The user terminal 500 mainly includes a processor 501 (there may be one or more processors 501 in the user terminal 500, and one processor is used as an example in FIG. 9), a memory 502, and a communications port 503, and further includes a TA 504 stored on the memory 502.

It should be noted herein that this embodiment of this application further includes a TEE. The TEE may be an environment constructed using the processor 501 as a main processor and cooperating with the memory 502 and other hardware, or may be an environment that is independent of the processor 501 and that is constructed by a separate coprocessor and other hardware (such as the memory). The memory in the TEE stores the TA 504, to implement the functions implemented by the TA in this application. Details are not described herein again.

The user terminal 500 further includes parts such as an SE 505 described in the foregoing embodiment, a power supply, a computer program (including the TA 504) that is stored on the memory 502 and that can be executed by the processor 501, and an operating system installed on hardware. The parts are not enumerated in FIG. 9, but do not constitute a limitation on the user terminal in this embodiment of this application. In some embodiments of this application, the processor 501, the memory 502, the communications port 503, the SE 505, and the like may be connected through a bus or in another manner. No specific limitation is imposed herein. An example in which connection is performed through the bus is used for description in FIG. 9.

The memory 502 may include a ROM and a RAM, or may include another memory or storage medium, and provide the processor 501 with an instruction and data. A part of the memory 502 may further include an NVRAM. The memory 502 stores an operating system and an operation instruction, an executable module or a data structure, or a subset thereof, or an extended set thereof. The operation instruction may include various operation instructions to implement various operations. The operating system may include various system programs. In this embodiment of this application, the memory 502 includes the TA 504, to implement various basic services and process hardware-based tasks. For details about functions of the TA 504, refer to descriptions of the TA in the foregoing method embodiments. The memory 502 further stores data, signaling, and the like in this embodiment of this application.

The processor 501 is configured to control operations of the user terminal 500. The processor 501 may also be referred as a CPU. In specific application, components of the user terminal 500 are coupled together through a bus system. In addition to a data bus, the bus system may include a power bus, a control bus, a status signal bus, and the like. However, for clarity of description, various buses are referred to as the bus system in FIG. 9.

The method on a user terminal side disclosed in the embodiments of this application may be applied to the processor 501, or may be implemented by the processor 501. The processor 501 may be an IC chip and has a signal processing capability. In an implementation process of this embodiment of this application, each step performed on the user terminal side in this embodiment of this application may be implemented by the processor 501 by executing the computer program (including the TA 504) stored on the memory 502. The processor 501 may be a general-purpose processor, a DSP, an ASIC, an FPGA or another programmable logic device, a discrete gate or transistor logic device, or a discrete hardware component, and may implement or perform all methods, steps, and logical block diagrams disclosed in the embodiments of this application. The general-purpose processor may be a microprocessor, or the processor may be any conventional processor, or the like. Steps of the methods disclosed with reference to the embodiments of this application may be directly performed and completed by a hardware decoding processor, or may be performed and completed using a combination of hardware in the decoding processor and a software module. The software module may be located in a mature storage medium in the art, such as a RAM, a flash memory, a ROM, a PROM, an EEPROM, or a register. The storage medium is located in the memory 502, and the processor 501 reads information in the memory 502, to implement the steps on the user terminal side in the SE applet processing method in the embodiments of this application.

The communications port 503 may be configured to receive or send information/data, for example, obtain an SE applet command package fed back by an application server, and generate a signal related to a related setting and control of the user terminal to perform processing such as initialization on the user terminal.

Similarly, it should be noted that content such as information exchange between the modules/units in the foregoing apparatus or an execution process is based on a same idea as the method embodiments in the embodiments of this application. For more details, refer to the method embodiments, and technical effects thereof are the same as those in the method embodiments of this application. For specific content, refer to the descriptions in the method embodiments described above in this application. Details are not described herein again.

An embodiment of this application further provides a computer storage medium, where the computer storage medium stores a computer program, and when the computer program is executed by a computer, some or all of steps recorded on a server side in the foregoing method embodiments can be implemented, and further provides another computer storage medium, where the computer storage medium stores a computer program, and when the computer program is executed by a computer, some or all of steps recorded on a TA side or an SE side in the user terminal in the foregoing method embodiments can be implemented.

All or some of the foregoing embodiments may be implemented through software, hardware, firmware, or any combination thereof. When software is used to implement the embodiments, the embodiments may be implemented fully or partially in a form of a computer program product.

The computer program product includes one or more computer instructions. When the computer instructions are loaded and executed on a computer, the procedures or functions according to the embodiments of the present disclosure are fully or partially generated. The computer may be a general-purpose computer, a special-purpose computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium such as a solid state disk, or the like.

In addition, it should be noted that the described apparatus embodiments are merely examples. The units described as separate parts may or may not be physically separate, and parts displayed as units may or may not be physical units, may be located in one position, or may be distributed on a plurality of network units. Some or all of the modules may be selected based on actual requirements to achieve the objectives of the solutions of the embodiments. In addition, in the accompanying drawings of the apparatus embodiments provided in this application, connection relationships between modules indicate that the modules have communication connections with each other, and may be implemented as one or more communications buses or signal cables.

In the several embodiments provided in this application, it should be understood that the disclosed system, module, and method may be implemented in other manners. For example, the described apparatus embodiment is merely an example. For example, the module division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

Based on the description of the foregoing implementations, persons skilled in the art may clearly understand that this application may be implemented by software in addition to necessary universal hardware, or by dedicated hardware, including a dedicated IC, a dedicated CPU, a dedicated memory, a dedicated component, and the like. Generally, any functions that can be performed by a computer program can be easily implemented using corresponding hardware. In addition, a specific hardware structure used to achieve a same function may be of various forms, for example, in a form of an analog circuit, a digital circuit, a dedicated circuit, or the like. However, for this application, software program implementation is a better implementation in most cases. Based on such an understanding, the technical solutions of this application essentially or the part contributing to the other approaches may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in the embodiments of this application.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the spirit and scope of the technical solutions of the embodiments of this application.

What is claimed is:

1. A secure element (SE) applet processing method implemented by a user terminal, wherein the SE applet processing method comprises:
    receiving an installation request instructing a trusted application (TA) to obtain an SE applet command package, wherein the user terminal comprises a trusted execution environment (TEE) and an SE, wherein the TEE comprises the TA, wherein the SE applet command package comprises target signaling, wherein the target signaling comprises an SE auxiliary command and at least two SE load commands required to install a target SE applet, and wherein the at least two SE load commands are configured to be generated using at least two subfiles obtained by splitting an executable file of the target SE applet;
    obtaining, using the TA and in response to the installation request, the SE applet command package;
    parsing, using the TA, the SE applet command package to obtain the target signaling; and
    sending, using the TA, the target signaling to the SE to enable the SE to install the target SE applet according to the target signaling.

2. The SE applet processing method of claim 1, wherein each of the at least two SE load commands comprises at least one subfile.

3. The SE applet processing method of claim 1, wherein the executable file is a converted applet (CAP) file.

4. The SE applet processing method of claim 1, further comprising:
    downloading a target application program installation package, wherein the target application program installation package comprises the SE applet command package; and
    extracting, using the TA, the SE applet command package from the target application program installation package.

5. The SE applet processing method of claim 1, further comprising:
    establishing, using the TA, a secure channel between the TA and the SE; and
    sending, using the TA, the target signaling to the SE through the secure channel.

6. A user terminal, comprising:
    a secure element (SE); and
    a processor coupled to the SE and configured to:
        provide a trusted execution environment (TEE) in the user terminal, wherein the TEE comprises a trusted application (TA);
        receive an installation request instructing the TA to obtain an SE applet command package, wherein the SE applet command package comprises target signaling, wherein the target signaling comprises an SE auxiliary command and at least two SE load commands required to install a target SE applet, and wherein the at least two SE load commands are configured to be generated using at least two subfiles obtained by splitting an executable file of the target SE applet;
        obtain, using the TA and in response to the installation request, the SE applet command package;
        parse, using the TA, the SE applet command package to obtain the target signaling; and
        send, using the TA, the target signaling to the SE to enable the SE to install the target SE applet according to the target signaling.

7. The user terminal of claim 6, wherein each of the at least two SE load commands comprises at least one subfile.

8. A secure element (SE) comprised in a user terminal, wherein the user terminal comprises a trusted execution environment (TEE) and the SE, wherein the TEE comprises a trusted application (TA), and wherein the SE comprises:
    a receiving circuit configured to receive target signaling from the TA that is obtained by parsing an SE applet command package; and
    an installation circuit coupled to the receiving circuit and configured to install the target SE applet according to the target signaling, wherein the target signaling comprises an SE auxiliary command and at least two SE load commands required to install the target SE applet, and wherein the at least two SE load commands are configured to be generated using at least two subfiles obtained by splitting an executable file of the target SE applet.

9. The SE of claim 8, wherein each of the at least two SE load commands comprises at least one subfile.

10. The SE of claim 8, wherein the receiving circuit is further configured to receive, through a secure channel between the TA and the SE, the target signaling from the TA.

11. A computer program product comprising computer-executable instructions for storage on a non-transitory computer-readable storage medium that, when executed by a processor, cause a computer to:
    receive an installation request instructing a trusted application (TA) to obtain a secure element (SE) applet command package, wherein the SE applet command package comprises target signaling, wherein the target signaling comprises an SE auxiliary command and at least two SE load commands required to install a target SE applet, and wherein the at least two SE load commands are configured to be generated using at least two subfiles obtained by splitting an executable file of the target SE applet;
    obtain, using the TA and in response to the installation request, the SE applet command package;
    parse, using the TA, the SE applet command package to obtain the target signaling; and
    send, using the TA, the target signaling to an SE to enable the SE to install the target SE applet according to the target signaling, wherein the computer comprises the SE.

12. The computer program product of claim 11, wherein each of the at least two SE load commands comprises at least one subfile.

13. The computer program product of claim 11, wherein the executable file is a converted applet (CAP) file.

14. The computer program product of claim 11, wherein the computer-executable instructions further cause the computer to:

download a target application program installation package, wherein the target application program installation package comprises the SE applet command package; and     extract, using the TA, the SE applet command package from the target application program installation package.

15. The computer program product of claim 11, wherein the computer-executable instructions further cause the computer to:

establish, using the TA, a secure channel between the TA and the SE; and     send, using the TA, the target signaling to the SE through the secure channel.

16. The user terminal of claim 7, wherein the executable file is a converted applet (CAP) file.

17. The user terminal of claim 6, wherein the processor is further configured to download a target application program installation package, and wherein the target application program installation package comprises the SE applet command package.

18. The user terminal of claim 17, wherein the processor is further configured to extract, using the TA, the SE applet command package from the target application program installation package.

19. The user terminal of claim 6, wherein the processor is further configured to establish, using the TA, a secure channel between the TA and the SE.

20. The user terminal of claim 19, wherein the processor is further configured to send, using the TA, the target signaling to the SE through the secure channel.

\* \* \* \* \*